United States Patent Office 3,136,606
Patented June 9, 1964

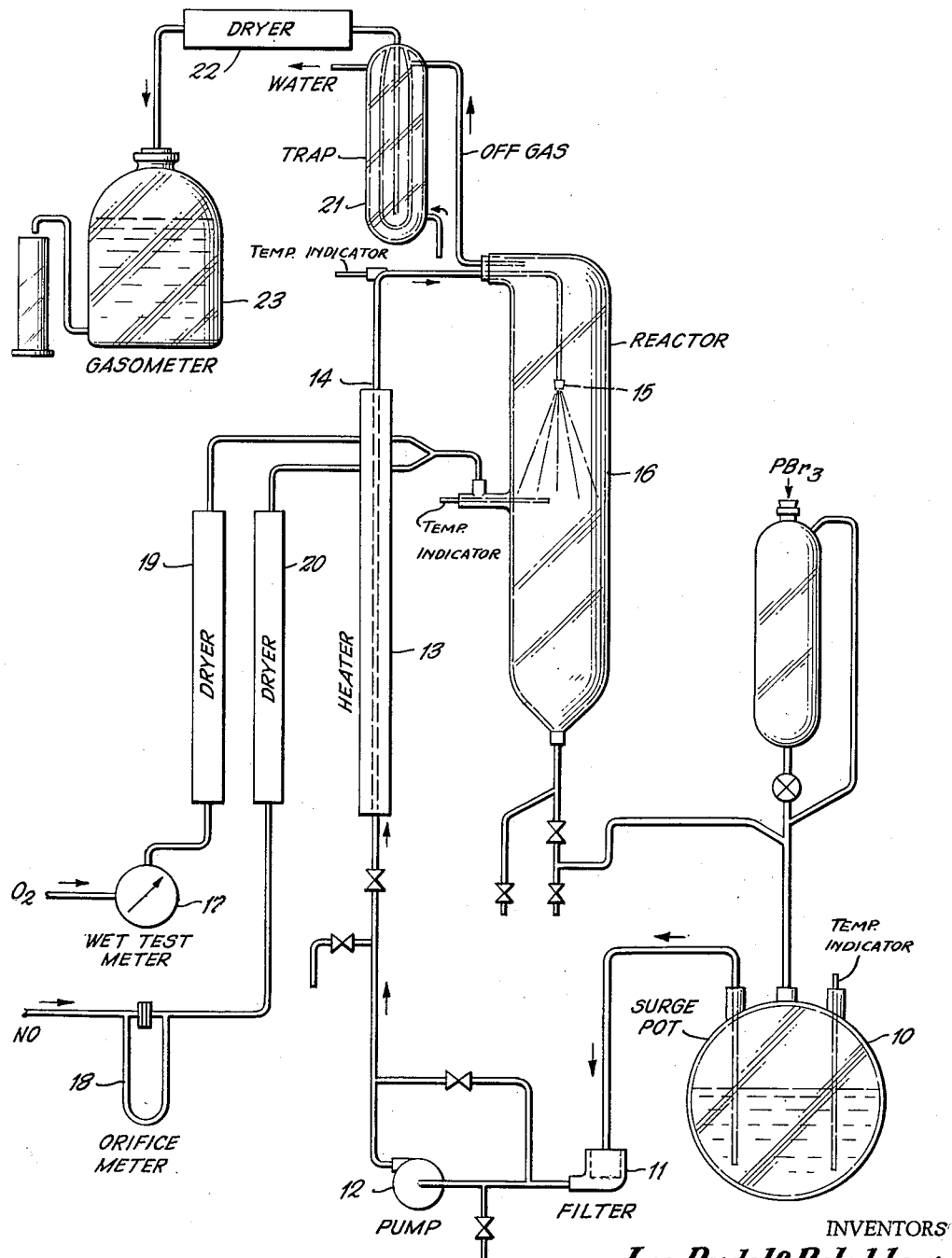
INVENTORS
*Leo Rudolf Belohlav
& Conrad Martin Ness*
BY *Dean Lawrence*
ATTORNEY

3,136,606
PREPARATION OF PHOSPHORUS OXYBROMIDE
Leo Rudolf Belohlav and Conrad Martin Ness, both of Lafayette, Ind., assignors to Great Lakes Chemical Corporation, West Lafayette, Ind., a corporation of Michigan
Filed Nov. 17, 1961, Ser. No. 153,138
3 Claims. (Cl. 23—203)

This invention relates to an improved method for the preparation of phosphorous oxybromide.

Phosphorus oxybromide is becoming of increased importance as a raw material for the preparation of flame-retardant compositions. Although phosphorus oxybromide has been known for a considerable time, it has not been available in large quantities heretofore apparently because no adequate commercial method for its preparation was known. While the most straightforward approach to the preparation of phosphorus oxybromide would be the direct oxidation of phosphorus tribromide, oxygen and phosphorus tribromide can be heated up to the boiling point of the latter without any apparent reaction taking place.

Geuther and Michaelis, Ber., 6, 766 (1871), in an attempt to prepare the bromine analog of pyrophosphoryl chloride by reacting gaseous nitrogen trioxide and nitrogen tetroxide with phosphorus bromide, noted the formation of phosphorus oxybromide and phosphorus pentoxide. This reaction was further pursued by Johnson and Ninn, J. Am. Chem. Soc., 63, 142 (1941), who treated samples of phosphorus tribromide with varying amounts of nitric oxide and oxygen in a closed system. Basing their findings primarily on the amount of oxygen consumed, the authors proposed the hypothesis that phosphorus oxybromide is the main product formed in the non-explosive oxidation of phosphorus tribromide. Using the method of Johnson and Ninn, it is extremely difficult, if not impossible, to react phosphorus tribromide with oxygen in the presence of nitrogen dioxide to make practical quantities of phosphorus oxybromide without the danger of explosion.

We have discovered that the product itself, phosphorus oxybromide, is an excellent moderator for the above reaction. When phosphorus oxybromide is present in the initial reaction mixture in an amount at least 30 percent by weight of said mixture, no explosions occur even at extremely high concentrations of the catalyst, and the rate of reaction is readily controlled by external cooling or heating of the reaction vessel.

The invention sought to be patented resides in the concept of a process for the preparation of phosphorus oxybromide which includes introducing phosphorus tribromide, nitrogen dioxide, and an oxygen-containing gas into a heated reaction zone, and maintaining at least 30 percent by weight of phosphorus oxybromide in the reaction mixture in said zone.

The manner and process of using this invention is illustrated by the following general description and examples, which set forth the best mode contemplated by us of carrying out the invention so as to enable any person skilled in the art of chemistry to make and use the same:

The critical reaction temperature range for the nitrogen dioxide catalyzed reaction of phosphorus tribromide and oxygen is between 60 and 150 degrees centigrade with the preferred range being between 100 and 130 degrees centigrade. While more favorable reaction rates are obtained above 100 degrees centigrade, the temperature should be held below 130 degrees centigrade to minimize thermal decomposition in the system. Oxygen may be provided as air or other otherwise unreactive gas mixtures containing 20 to 100 volume percent of oxygen, the gas stream being freed from moisture prior to use.

Since the process requires intimate contact between the oxygen-rich gas phase and the liquid phase containing phosphorus tribromide, the rate of reaction is promoted by efficient stirring. Nitrogen dioxide need be present in the reaction mixture only in catalytic amounts, conveniently 0.1 to 5 volume percent in the gas phase. Neither the concentration of oxygen nor the concentration of nitrogen dioxide is critical; but in order to achieve practical rates of reaction, minimum quantities of 0.1 and 20 volume percent of nitrogen dioxide and oxygen, respectively, should be present. As expected, increasing the ratio of these gases in the reaction mixture will increase the rate of reaction observed. But an increase of beyond 5 volume percent of nitrogen dioxide will afford no further practical increase in the rate of reaction.

The Johnson and Ninn paper cited supra postulates nitrogen tetroxide to be the oxide of nitrogen kinetically involved in catalyzing the reaction of phosphorus tribromide and oxygen to yield phosphorus oxybromide. As is well known, nitrogen tetroxide and nitrogen dioxide exist in equilibrium with each other according to the equation $2NO_2 \rightleftharpoons N_2O_4$. For convenience, nitrogen dioxide is referred to throughout the specification as being the catalyst, although it is understood that the tetroxide may be the form which governs the kinetics of the reaction.

Nitric oxide reacts readily with oxygen to form nitrogen dioxide, and it is usually more convenient to add nitric oxide to the reaction mixture forming the nitrogen dioxide in situ. Since nitrogen sesquioxide ($N_2O_3$) behaves as a mixture of nitric oxide and nitrogen dioxide, its use in the process of the present invention would give the same results as that obtained by nitrogen dioxide.

The following examples are offered to illustrate further means by which this process of the present invention may be used to produce phosphorus oxybromide and are not intended to limit the scope of the invention:

Example 1

A laboratory scale run was made using an apparatus consisting of a flask equipped with a stirrer and with a gas inlet for nitrogen tetroxide and oxygen, a gas outlet for exit gases, and measuring devices for the inlet and exit gases. The flask was charged with 1750 cubic centimeters of a mixture comprised of 23.5 percent by weight of phosphorus tribromide and 76.5 percent by weight of phosphorus oxybromide. The flask was brought to the reaction temperature and dry oxygen containing the nitric oxide added. Oxygen uptake was determined by measuring the difference in rate between the inlet and exit gases. The reaction was run for approximately three hours at temperatures of from 120 to 150 degrees centigrade; oxygen uptake rates of from 1.2 to 0.1 liters per minute were measured during that time. After the oxidation was complete, as indicated by the decrease in oxygen uptake, a sample of the reaction mixture was withdrawn from the flask and found to contain 97.5 percent of phosphorus oxybromide. Subsequent vacuum distillation of this material in a single stage distillation apparatus produced a colorless product whose properties match those given in the literature for pure phosphorus oxybromide.

Example 2

A pilot scale run was made in an apparatus similar to that illustrated in FIGURE 1. The apparatus consisted of a spray type reaction chamber, a surge pot, a pump, and a heat exchanger along with the accessory equipment required for the addition and measurement of the gas and liquid reactants and measurement of the exit gases. The system was charged with approximately 3000 cubic centimeters of a mixture comprised of 26 weight percent of phosphorus tribromide and 74 weight percent of phosphorous oxybromide. The liquid reactants were recirculated into the reactor through a spray nozzle at rate of approximately 800 cubic centimeters per minute. After the temperature of the system was brought up to the desired range, the addition of oxygen and nitric oxide was begun. The reaction progressed for 1½ hours at temperatures ranging from 120 to 130 degrees centigrade and at oxygen uptake rates up to 3 liters per minute. During this time the oxygen concentration in the reaction chamber was approximately 40 percent and the nitrogen tetroxide concentration approximately 0.5 to 1 percent. When the reaction rate declined, as indicated by a decrease in oxygen uptake, a sample of the liquid was removed from the system and found to contain 96 percent by weight phosphorus oxybromide. Single stage vacuum distillation of this material yielded colorless phosphorus oxybromide melting higher than 53 degrees centigrade and analyzing within 0.1 percent of the theoretical bromine content.

*Example 3*

The semi-continuous operation of our process utilizing the apparatus shown in FIGURE 1 is as follows:

A mixture containing the prestated proportions of phosphorus oxybromide and phosphorus tribromide is placed in a surge pot 10. A pump 12 draws the mixture through a filter 11 and passes it through a heater 13. The material then is sprayed into a reactor 16 through a spray nozzle 15. From the reactor it drops through a trap and back to the surge pot 10. The oxygen and nitric oxide are passed through their respective meters 17 and 18 and driers 19 and 20 and into the reactor 16. The off-gas line from the reactor 16 is provided with a trap 21, a drier 22, and a gasometer 23. At the start of an operating cycle, the heater 13 is used to bring the temperature in the system up to the point where the oxidation reaction commences. Measurement of the temperature within the reactor 16 gives an accurate indication of the reaction rate. As the reaction rate increases the amount of heat supplied by the heater 13 can be decreased due to the exothermic nature of the oxidation. The reaction rate can also be followed by the rate of oxygen consumption.

As the oxidation of the liquid charge nears completion, the rate of oxygen consumption decreases as shown by its increasing appearance in the off-gas stream. At the same time, the reactor temperature falls off. The melting point of the liquid is then checked to determine the phosphorus oxybromide content. When the desired concentration is reached, a portion of the liquid is withdrawn from the bottom of the reaction 16, more phosphorus tribromide is added to the system via the surge pot 10, and the cycle is repeated. The concentration of phosphorus oxybromide in the reactor is never allowed to fall below 30 percent at any time.

The process can also be run on a continuous basis by the use of multiple reactors in series, or using a single reactor with multiple passes in series.

The subject matter which the applicants regard as their invention is particularly pointed out and distinctly claimed as follows:

1. In a process for the preparation of phosphorus oxybromide ($POBr_3$) by the oxidation with uncombined oxygen in its molecular form of phosphorus tribromide at a temperature of about 60 to 150 degrees centigrade, catalyzed with at least 0.1 volume percent of nitrogen dioxide ($NO_2$), the improvement which comprises maintaining in the reaction mixture at all times during the oxidation at least 30 percent by weight of phosphorus oxybromide ($POBr_3$) calculated on the reaction mixture.

2. In a process for the preparation of phosphorus oxybromide ($POBr_3$) by the oxidation with uncombined oxygen in its molecular form of phosphorus tribromide at a temperature of about 60 to 150 degrees centigrade, catalyzed with at least 0.1 volume percent of nitrogen dioxide ($NO_2$), the improvement which comprises conducting the oxidation by spraying a mixture of phosphorus tribromide and at all times at least 30 percent by weight of phosphorus oxybromide into a gaseous atmosphere containing the oxygen and the nitrogen dioxide until oxygen uptake substantially ceases.

3. In a process for the preparation of phosphorus oxybromide ($POBr_3$) by the oxidation with uncombined oxygen in its molecular form of phosphorus tribromide at a temperature of about 100 to 130 degrees centigrade, catalyzed with at least 0.1 volume percent of nitrogen dioxide ($NO_2$), the improvement which comprises thoroughly mixing a liquid mixture of phosphorus tribromide and at least 30 percent by weight of phosphorus oxybromide with the oxygen and the nitrogen dioxide, removing phosphorus oxybromide from the reaction mixture and adding additional phosphorus tribromide thereto, while at all times maintaining in the reaction mixture at least 30 percent by weight of phosphorus oxybromide.

References Cited in the file of this patent

UNITED STATES PATENTS 1,888,713    Britton et al. _____ Nov. 22, 1932

OTHER REFERENCES

Mellor: "Comprehensive Treatise on Inorganic and Theoretical Chemistry," vol. 8, Longmans, Green and Co., N.Y., 1928, pages 382, 1002, 1012, 1023, 1032, 1035 and 1036.

Johnson et al.: "Catalytic Oxidation of Phosphorus Tribromide," Journal of the American Chemical Society, vol. 63, January-June 1941, pages 141–143.